UNITED STATES PATENT OFFICE.

WILLARD OHLIGER, OF DETROIT, MICHIGAN, ASSIGNOR TO FREDERICK STEARNS & COMPANY, OF DETROIT, MICHIGAN, A CORPORATION OF MICHIGAN.

PHARMACEUTICAL PRODUCT FROM THE SUPRARENAL GLANDS AND PROCESS OF OBTAINING THE SAME.

1,003,646.     Specification of Letters Patent.     Patented Sept. 19, 1911.

No Drawing.     Application filed January 10, 1905. Serial No. 240,502.

*To all whom it may concern:*

Be it known that I, WILLARD OHLIGER, residing at Detroit, in the county of Wayne and State of Michigan, a citizen of the United States, have invented certain new and useful Improvements in Pharmaceutical Products from the Suprarenal Glands and Processes of Obtaining the Same, of which the following is a specification.

It is the object of the invention to obtain a product in the form of a solution containing the blood-pressure-raising constituents of the suprarenal glands, comparatively free from impurities and possessing greater stability than products heretofore obtained.

It is a further object to obtain from the glands an increased yield of the desired product.

With these objects in view, the invention consists, first, in the process of extracting and purifying the product, the latter being at no time precipitated, but remaining in solution from start to finish; second, in the means employed for protecting the product from decomposition during the process of purification; third, in the association with the product, in its purified condition, of a substance imparting stability, without modifying its physiological characteristics.

In the preparation of blood-pressure-raising products from the suprarenal glands, it is usual to precipitate the product in a crude form from the fluid extract of the glands, and to then purify this product by re-dissolving and precipitating it a number of times. Each time the product is thus precipitated, there is a loss, *i. e.* a certain percentage cannot be thrown out of the solution. As a consequence, the more frequent the precipitation, the smaller will be the yield. A further source of loss is due to oxidation or decomposition of a portion of the product during treatment. This loss is diminished by protecting the fluid extract from the air, as by a film of fat on the top of the liquid, but nevertheless a certain portion of the product is destroyed. With my improved process, loss of the product is prevented, first, by maintaining it in solution from start to finish, and second, by the use of an active reducing agent in the solution, which effectually prevents oxidation of the product.

The purified products heretofore obtained have been stable only while maintained in the crystalline form. In solution, these products are unstable, changing in color and gradually deteriorating, this action being hastened by exposure to light. My improved product is practically stable in solution. As first obtained, it is colorless, and after week's standing and exposure to sunlight, it remains unchanged.

In carrying out my process, the first step is to obtain a fluid extract of the glands. This is preferably accomplished by the use of an acidified alcohol, the acid rendering the desired product more readily soluble than in pure alcohol. In detail, the glands are first freed from adherent fat and tissue and are then finely minced by suitable means. They are then placed in acidified alcohol, methyl alcohol and tri-chlor-acetic acid being preferred, and in a proportion of about five or six per cent. of the acid. The quantity of alcohol used for a given weight of glands is preferably about 1 to 2. To prevent oxidation of the active principle during the maceration and digestion of the glands, a small quantity of a suitable reducing agent is added to the solution, as for instance 0.25% of sodium sulfite. In place of this, other reducing agents, as for example hydrogen sulfite, sulfur dioxid and zinc may be used. The presence of this active reducing agent effectually prevents oxidation of the active principle during this first step of the process. In adding the acidulated alcohol to the glands, great care is taken that the acid alcohol well penetrates the tissues instead of merely coagulating the individual particles. The mixture is then digested at a temperature of about 55 degrees C. for twelve hours, after which the liquid is pressed out by suitable means. The use of the alcohol as a solvent prevents the introduction into the solution of many impurities which are present in the water extract and thus, the liquid when pressed out, is almost colorless. The liquid is next heated to the boiling point in an open vessel to coagulate a part of the proteids. It is then filtered and the colorless filtrate condensed preferably under diminished pressure to about one-sixth of its volume. In case of further precipitation of inert substances during concentration, the liquid is again filtered. The liquid thus obtained still contains proteids. These are next eliminated by the addition of soluble metallic salts, such as neutral lead-acetate or zinc chlorid, which throw down the proteids as a precipitate. The mixture is allowed to stand for several hours after the precipitate has settled and the clear liquid is decanted or filtered off. To eliminate any excess of the metallic salts still remaining in the solution, hydrogen sulfid gas is added, the liquid being constantly stirred. The precipitated metal is then filtered out. To the clear liquid obtained, a further addition of the reducing agent is made, preferably 0.5% of sodium sulfite and in case the solution is rendered alkaline by this addition, hydrochloric acid is also added. The quantity added is such as to render the solution slightly acid. For commercial use, the solution thus obtained is diluted with well boiled distilled water, so that 1 cc. of the solution will represent 1 gm. of the gland. The finished solution is neutralized by the addition of N/50 solution of potassium hydrate, in the proportion of about 12 cc. of the potassium hydrate to 10 cc. of the solution. If still too acid, sufficient sodium hydrate is added to bring the solution to proper acidity.

The final solution has the form of a clear practically colorless liquid. It reduces ammoniacal solution of silver and assumes temporarily an intensely green color on addition of a drop of a solution of chlorid of iron. As has been previously stated, the solution is stable, even where exposed to sun-light.

What I claim as my invention is:—

1. A pharmaceutical product, consisting of the blood-pressure-raising substance of the suprarenal glands and an associated reducing agent.

2. The process of obtaining a purified fluid extract of the blood pressure raising substance from the suprarenal glands which consists in forming a fluid extract of the glands by the use of alcohol and tri-chloracetic acid, in boiling said extract to precipitate out nonactive bodies, in concentrating the extract, in precipitating out the remaining nonactive bodies by the addition of soluble metallic salts, in eliminating the excess of said soluble salts by precipitation with a volatile precipitant and in performing all of the steps of the process in the presence of a nonsuprarenal substance which is a reducing agent.

3. In the herein-described process of obtaining the blood-pressure-raising substance from the suprarenal glands, the step which consists in extracting the glands in the presence of a liquid containing a non-suprarenal reducing agent.

4. In the herein-described process of obtaining the blood-pressure-raising substance from the suprarenal glands, the steps which consist in forming a liquid extract of the glands, adding thereto a non-suprarenal substance which is a reducing agent to form a liquid containing a non-suprarenal reducing agent, and in eliminating the non-active constituents therefrom while under the action of said reducing agent.

5. In the herein-described process of obtaining the blood-pressure-raising substance from the suprarenal glands, the steps which consist in extracting the glands with acidified alcohol, in then concentrating and eliminating further impurities by re-agents other than acidified alcohol.

6. In the herein-described process of obtaining the blood-pressure-raising substance from the suprarenal glands, the steps which consist in first extracting the glands with acidified methyl alcohol and then concentrating the extract and eliminating impurities by re-agents other than acidified methyl alcohol.

7. In the herein-described process of obtaining the blood-pressure-raising substance from the suprarenal glands, the steps which consist in extracting the glands with alcohol and tri-chlor-acetic acid, in then concentrating the extract and further eliminating the impurities by re-agents other than tri-chloracetic acid.

8. In the process of obtaining a purified fluid extract of the blood-pressure-raising substance from the suprarenal glands, the steps which consist in forming a fluid extract of the glands, and in precipitating non-active constituents therefrom by the addition of metallic salts, and in removing the precipitate and the excess of said metallic salts, while maintaining the active substance in solution.

9. In the process of obtaining the blood-pressure-raising substance from the suprarenal glands, the steps which consist in forming an alcoholic extract of the glands, in concentrating the extract and in precipitating remaining non-active bodies from the solution by metallic salts.

10. In the herein-described process of obtaining the blood-pressure-raising substance from the suprarenal glands, the steps which consist in forming an alcoholic extract of the glands, in boiling said extract to precipitate out non-active bodies, in then concentrating the extract and precipitating out remaining non-active bodies, by addition of metallic salts.

11. In the herein-described process of obtaining the blood-pressure-raising substance from the suprarenal glands, the steps which consist in forming a fluid extract of the glands, concentrating said extract, precipitating out non-active bodies by the addition of soluble metallic salts and in eliminating the excess of said soluble salts by a volatile precipitant.

In testimony whereof I affix my signature in presence of two witnesses.

WILLARD OHLIGER.

Witnesses:
 H. C. SMITH,
 ED. D. AULT.